(12) United States Patent
Yasunaga et al.

(10) Patent No.: US 11,503,200 B2
(45) Date of Patent: Nov. 15, 2022

(54) PHOTOGRAPHING DEVICE AND PHOTOGRAPHING METHOD

(71) Applicant: TOSHIBA TEC KABUSHIKI KAISHA, Tokyo (JP)

(72) Inventors: Masaaki Yasunaga, Sunto Shizuoka (JP); Keita Yamazaki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/237,941

(22) Filed: Apr. 22, 2021

(65) Prior Publication Data

US 2022/0060615 A1 Feb. 24, 2022

(30) Foreign Application Priority Data

Aug. 24, 2020 (JP) .............................. JP2020-140991

(51) Int. Cl.
*H04N 5/232* (2006.01)
*G06Q 30/06* (2012.01)

(52) U.S. Cl.
CPC ......... *H04N 5/23206* (2013.01); *G06Q 30/06* (2013.01); *H04N 5/23229* (2013.01); *H04N 5/232935* (2018.08)

(58) Field of Classification Search
CPC ......... H04N 5/23206; H04N 5/232935; H04N 5/23229; G06Q 30/06
See application file for complete search history.

(56) References Cited

U.S. PATENT DOCUMENTS

| | | | |
|---|---|---|---|
| 2010/0002071 A1* | 1/2010 | Ahiska | H04N 5/23238 348/36 |
| 2011/0063446 A1* | 3/2011 | McMordie | G06K 9/209 348/159 |
| 2019/0273889 A1* | 9/2019 | Aihara | H04N 5/3696 |
| 2020/0160073 A1* | 5/2020 | Cho | G06V 10/82 |

FOREIGN PATENT DOCUMENTS

WO WO-2015/140851 4/2017

\* cited by examiner

*Primary Examiner* — Yogesh K Aggarwal
(74) *Attorney, Agent, or Firm* — Foley & Lardner LLP (57) ABSTRACT

According to at least one embodiment, a photographing device includes a camera interface and a processor. The camera interface supplies a control signal to a camera and acquires a photographed image photographed by the camera. The processor causes the camera to photograph a wide area image in a detection region of target objects set as a photographing range, detects the target objects present in the wide area image photographed by the camera, determines a photographing order of the target objects detected from the wide area image, and causes the camera to photograph a narrow area image of one target object selected according to the photographing order.

15 Claims, 4 Drawing Sheets

PHOTOGRAPHING DEVICE AND PHOTOGRAPHING METHOD

CROSS-REFERENCE TO RELATED APPLICATION

This application is based upon and claims the benefit of priority from Japanese Patent Application No. 2020-140991, filed on Aug. 24, 2020, the entire contents of which are incorporated herein by reference.

FIELD

At least one embodiment described herein relates generally to a photographing device and a photographing method.

BACKGROUND

A photographing system for managing articles placed on a shelf corresponding to a shelf tag can recognize information described on the shelf tags set in the shelf from an image photographed by a camera. Such a photographing system needs to photograph the shelf at a resolution high enough for recognizing the information described on the shelf tags.

However, in a store, a warehouse, or the like, it is not easy to photograph a shelf at a resolution high enough for recognizing information described on shelf tags. For example, photographing an entire shelf at high resolution using a high-resolution camera is inefficient for the purpose of recognizing shelf tags. Moving a photographing direction of a camera to photograph regions of shelf tags has a problem in that control of the photographing direction, zooming, and the like is complicated and takes time.

Related art is described in, for example, WO 2015/140851.

DETAILED DESCRIPTION

At least one embodiment provides a photographing device and a photographing method that can efficiently photograph target objects disposed in a wide range in order to solve the problems described above.

According to at least one embodiment, a photographing device includes a camera interface and a processor. The camera interface supplies a control signal to a camera and acquires a photographed image photographed by the camera. The processor causes the camera to photograph a wide area image in a detection region of target objects set as a photographing range, detects the target objects present in the wide area image photographed by the camera, determines photographing order of the target objects detected from the wide area image, and causes the camera to photograph a narrow area image of one target object selected according to the photographing order.

At least one embodiment is explained below with reference to the drawings.

Figure 1:
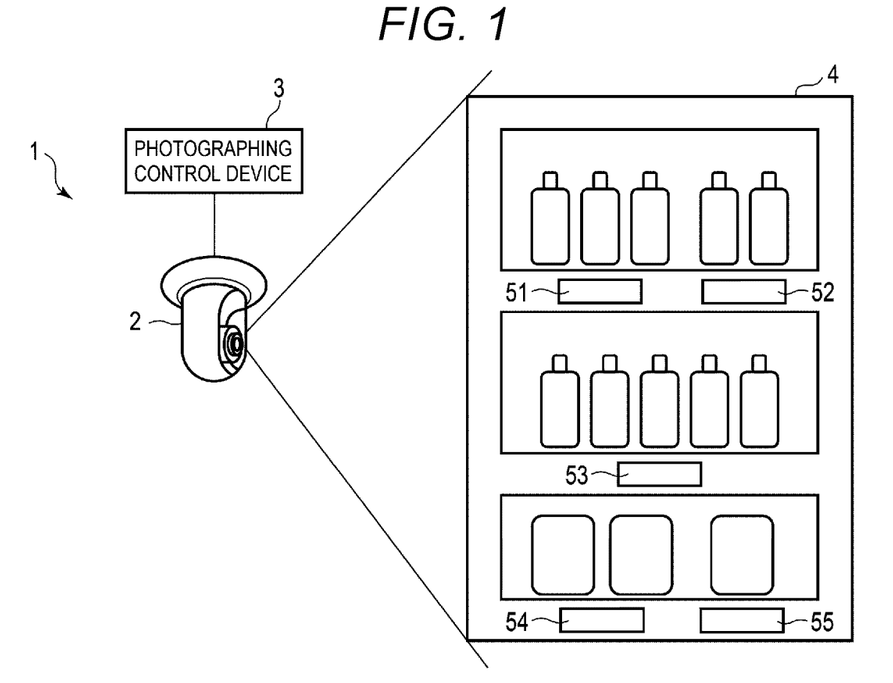
FIG. 1 is a diagram conceptually illustrating a configuration example of a photographing system and the like according to at least one embodiment.

FIG. 1 is a diagram illustrating a configuration example of a photographing system 1 according to at least one embodiment. In at least one embodiment, the photographing system 1 is a system that photographs shelf tags 5 (51 to 55) set in a shelf 4 at resolution enough for recognizing information displayed by the shelf tags 5.

In the configuration example illustrated in FIG. 1, the photographing system 1 includes a camera 2 and a photographing control device 3. In the photographing system 1, the camera 2 controlled by the photographing control device 3 photographs, as target objects, the shelf tags 5 (51 to 55) set on the shelf 4.

For example, the photographing system 1 photographs the shelf tags 5 relating to commodities displayed on the shelf 4 or the like in a store or the like. The photographing system 1 may photograph the shelf tags 5 describing information relating to articles disposed on a shelf or the like in a warehouse, a distribution center, or the like. However, the photographing system 1 may be used to photograph target objects other than the shelf tags. That is, target objects photographed by the photographing system 1 are not limited to specific objects such as the shelf tags.

In the configuration example illustrated in FIG. 1, the shelf 4 includes three shelf stages on which commodities (e.g., articles) are disposed. The shelf stages of the shelf 4 are formed by shelf plates on which commodities are disposed. The shelf tags 5 are attached to the front surfaces of the shelf plates forming the shelf stages. The shelf tags 5 are attached to positions corresponding to disposition positions of the commodities in the shelf stages. For example, when viewed from the front of the shelf 4, commodities corresponding to information displayed by the shelf tags 5 are disposed side by side behind the shelf tags 5.

Predetermined information is displayed on the shelf tags 5 (51 to 56). For example, the shelf tags 5 display information (e.g., commodity names, prices, and the like) relating to commodities corresponding to the shelf tags 5. As the information relating to the commodities displayed on the shelf tags 5, there is information such as commodity names, prices of the commodities and the like. The shelf tags 5 may display code images (barcodes, two-dimensional codes, or the like) obtained by encoding management information of the shelf tags 5 or commodity information of the commodities corresponding to the shelf tags 5.

In the example illustrated in FIG. 1, five shelf tags 51 to 55 are attached to the shelf 4. The shelf tags 51 and 52 are attached to the front surface of a shelf plate forming a first shelf stage in the shelf 4. The shelf tag 53 is attached to the front surface of a shelf plate forming a second shelf stage in the shelf 4. The shelf tags 54 and 55 are attached to the front surface of a shelf plate forming a third shelf stage in the shelf 4. The positions and the number of the shelf tags 5 attached to the shelf 4 are not limited to a specific configuration.

The camera 2 is set to be able to photograph the entire shelf 4 to which the shelf tags 5 are attached. In at least one embodiment, the camera 2 is fixed to a predetermined position. However, the camera 2 may move. The camera 2 can change a photographing direction and photographing magnification according to a control signal received from the photographing control device 3.

For example, the camera 2 is a PTZ (Pan Tilt Zoom) camera capable of performing panning, tilting, and zooming according to a control signal received from the photographing control device 3. In the PTZ camera, the panning (Pan) means movement in the horizontal direction of the angle of view of the camera. In the PTZ camera, the tilting (Tilt) means movement in the vertical direction of the angle of view of the camera. In the PTZ camera, the zooming (Zoom) means zoom-up and zoom-out of an image to be photographed.

The photographing control device 3 controls the camera 2 and processes an image photographed by the camera 2. For example, when detecting regions of shelf tags, the photographing control device 3 sets photographing conditions in the camera 2 for photographing an image in a region in a wide range (a wide area image) at low resolution. The photographing control device 3 causes the camera 2 to photograph the wide area image as an image for detecting the regions (positions) of the shelf tags in the region in the wide range set as a detection region for the shelf tags. The wide area image is an image from which the shelf tags in the wide range set as the detection target for the shelf tags can be extracted. Accordingly, the photographing control device 3 causes the camera 2 to photograph the wide area image at low resolution enough for extracting the regions of the shelf tags.

If the photographing conditions for the wide area image for detecting shelf tag regions are set in the camera 2, the photographing control device 3 acquires an image (a wide area image) photographed by the camera 2. If acquiring the wide area image photographed by the camera 2, the photographing control device 3 performs processing for detecting the shelf tag regions including images of the shelf tags from the wide area image.

In order to recognize information displayed by the shelf tags, the photographing control device 3 sets photographing conditions in the camera 1 for photographing, at high resolution, narrow ranges including the shelf tag regions extracted from the wide area image. The photographing control device 3 causes the camera 2 to photograph narrow area images as images for recognizing the information displayed by the shelf tags in the shelf tag regions extracted from the wide area image. The narrow area images are images obtained by photographing the shelf tag regions at high resolution enough for recognizing information displayed by an individual shelf tag. Accordingly, the photographing control device 3 causes the camera 2 to photograph, as the narrow area images, images of narrow regions narrowed to the shelf tag regions at high resolution enough for recognizing the information displayed by the shelf tags.

If the photographing conditions for the narrow area images in photographing regions narrowed to the shelf tag regions are set in the camera 2, the photographing control device 3 acquires images (narrow area images) photographed by the camera 2. After acquiring the narrow area images photographed by the camera 2, the photographing control device 3 performs processing for recognizing the information displayed by the shelf tags included in the narrow area images.

The photographing control device 3 corrects, based on distortion information corresponding to the specifications of the camera 2, for example, positions of the shelf tag regions extracted from the wide area image. This is because distortion sometimes occurs in the wide area image photographed by the camera 2. Before photographing the narrow region images of the shelf tag regions, the photographing control device 3 determines an order (photographing order) for photographing the shelf tag regions extracted from the wide area image as narrow area images. The photographing control device 3 selects a shelf tag region according to the photographing order and causes the camera 2 to photograph a narrow area image corresponding to the selected shelf tag region.

Figure 2:
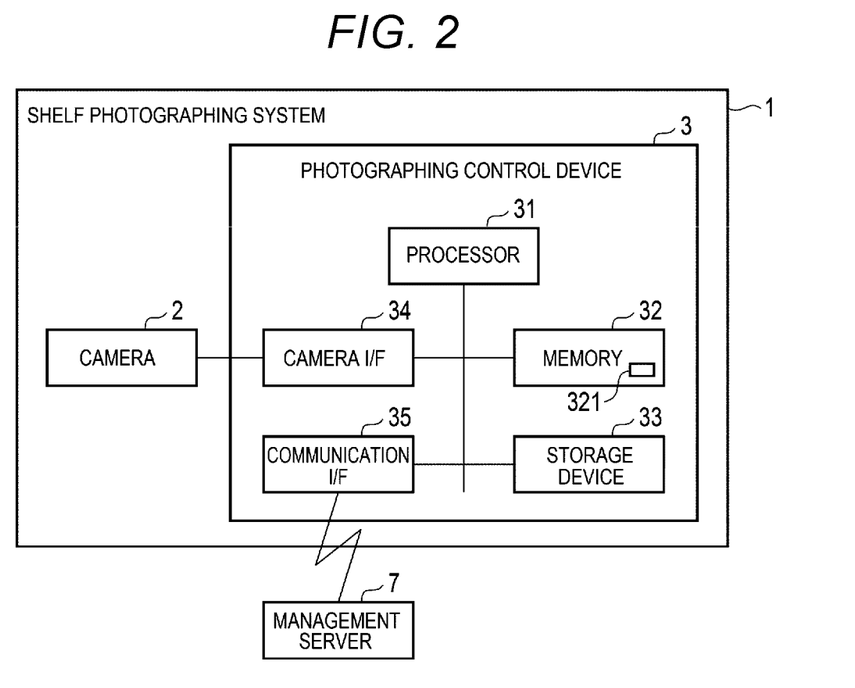
FIG. 2 is a block diagram illustrating a configuration example of a control system in a photographing control device according to at least one embodiment.

The configuration of a control system in the photographing control device 3 of the photographing system 1 according to at least one embodiment is explained.

FIG. 2 is a block diagram illustrating a configuration example of the control system in the photographing control device 3 according to at least one embodiment.

As illustrated in FIG. 2, the photographing control device 3 includes a processor 31, a memory 32, a storage device 33, a camera interface 34, and a communication interface 35.

The photographing control device 3 only has to be a device that can communicate with the camera 2. For example, the photographing control device 3 is a desktop PC, a notebook PC, a tablet PC, a smartphone, or the like. The photographing control device 3 may be configured integrally with the camera 2. For example, the photographing control device 3 may be a control device included in the camera 2.

The processor 31 is connected to the memory 32, the storage device 33, the camera interface 34, and the communication interface 35. The processor 31 executes control of the units (e.g., devices) and various kinds of processing. For example, the processor 31 is configured by a circuit including a CPU. The processor 31 may be configured by a circuit including an ASIC (Application Specific Integrated Circuit). The processor 31 may be configured by a circuit including an FPGA (Field Programmable Gate Array). The processor 31 executes a program stored by the memory 32 or the storage device 33. For example, the processor 31 executes the program to thereby execute operation control for the camera 2 and various kinds of processing such as image processing.

The memory 32 stores various data. For example, the memory 32 is a memory group including a ROM, a RAM, and a NVM. The RAM of the memory 32 temporarily stores data and the like during processing of the processor 31. The RAM of the memory 32 may temporarily store data necessary for execution of a program, an execution result of the program, and the like.

The ROM or the NVM of the memory 32 stores a program to be executed by the processor 31, control data, and the like. The memory 32 stores various programs for executing respective kinds of processing explained below.

The memory 32 stores information corresponding to the specifications of the camera 2. In at least one embodiment, the memory 32 includes a storage region 321 for storing information (distortion information) indicating distortion that occurs in a photographed image photographed by the camera 2. For example, the distortion information stored in the storage region 321 may be a table storing the information indicating the distortion in the photographed image or may be a formula for calculating the distortion.

The storage device 33 is a device that stores data. The storage device 33 is configured by a HDD (hard disk drive), an SSD (solid state drive), or the like. The storage device 33 saves, for example, an image acquired from the camera 2 via the camera interface 34. The storage device 33 may save information indicating, for example, a processing result for a photographed image of the camera 2 (for example, a recognition result of a shelf tag).

The camera interface 34 is connected to the camera 2. The camera interface 34 is an interface for transmitting and receiving data to and from the camera 2. For example, the camera interface 34 transmits a signal for instructing photographing conditions and the like from the processor 31 to the camera 2. The camera interface 34 acquires an image photographed by the camera 2. The camera interface 34 may supply electric power to the camera 2. For example, the camera interface 34 may support USB (universal serial bus) connection or may support connection by a camera link.

The communication interface 35 is an interface for communicating with an external management server 7. For example, the communication interface 35 is an interface for communicating with the management server 7 via a network such as a LAN (Local Area Network). The communication interface 35 may be an interface for performing communication by wire or may be an interface for performing communication by radio.

The management server 7 manages information for managing shelf tags disposed in a shelf and articles disposed to correspond to the shelf tags in the shelf. For example, the management server 7 retains layout information indicating which shelf tags are disposed in which positions in the shelf. That is, the communication interface 35 is an interface for transmitting, to the management server 7, a processing result including a result obtained by recognizing information displayed by the shelf tags from an image photographed by the camera 2. The communication interface 35 is an interface for acquiring, from the management server 7, layout information indicating a layout of the shelf tags or commodities disposed to correspond to the shelf tags.

The camera 2 sets photographing conditions such as a photographing direction, photographing magnification, and resolution according to a control signal received from the photographing control device 3. The camera 2 is, for example, a PTZ camera capable of performing panning, tilting, and zooming according to a control signal received from the photographing control device 3. The camera 2 such as the PTZ camera includes a driving mechanism for adjusting the photographing direction and the photographing magnification. The camera 2 drives the driving mechanism to thereby adjust the photographing direction to a photographing direction designated from the photographing control device 3. The camera 2 adjusts magnification for photographing an image to magnification designated from the photographing control device 3.

For example, if photographing a wide area image, the camera 2 is set to photograph a wide range at low resolution according to photographing conditions instructed from the photographing control device 3. If photographing a narrow area image, the camera 2 is set to photograph, at high resolution, a narrow region narrowed to a target shelf tag region according to photographing conditions instructed from the photographing control device 3.

The operation of the photographing system 1 according to at least one embodiment is schematically explained.

In the photographing system 1, the photographing control device 3 causes the camera 2 to photograph a wide area image in order to detect regions of shelf tags. The processor 31 of the photographing control device 3 determines a range to be photographed as the wide area image (a range in which the shelf tags are detected). For example, the processor 31 of the photographing control device 3 sets the entire shelf, which is a detection target of the shelf tags, as the photographing range of the wide area image. The processor 31 of the photographing control device 3 may detect a marker (for example, a two-dimensional code) disposed in a predetermined position of the shelf in advance to thereby determine the photographing range of the wide area image.

As a specific example, processing for recognizing information displayed by the shelf tags 5 disposed in the shelf 4 illustrated in FIG. 1 is explained.

Figure 3:
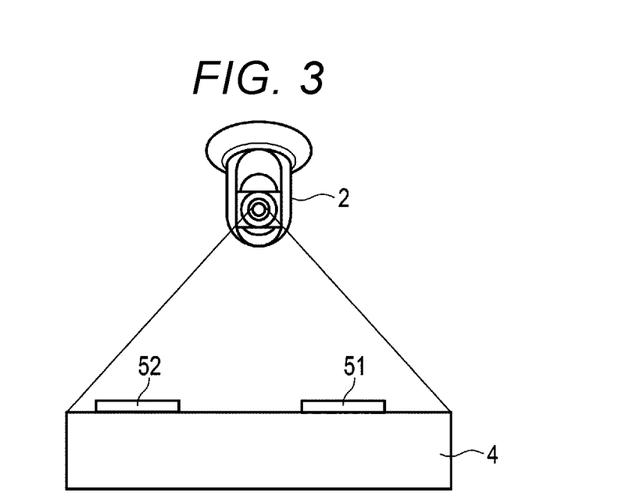
FIG. 3 is a diagram schematically illustrating a state in which a camera photographs a wide area image based on photographing conditions designated by the photographing control device.

FIG. 3 is a diagram schematically illustrating a state in which the camera 2 sets the entire shelf 4 as a photographing range and photographs a wide area image. In FIG. 3, as an example, a state in which the camera 2 positioned in front of the shelf 4 sets the entire shelf 4 as a photographing range and photographs a wide area image is viewed from above.

If the entire shelf 4 is a detection region of shelf tags, as illustrated in FIG. 3, the processor 31 of the photographing control device 3 determines a photographing direction (panning and tilting) and zooming magnification to set the entire shelf 4 as a photographing range. The processor 31 of the photographing control device 3 designates, to the camera 2, photographing conditions including low resolution for a wide area image in addition to the photographing direction and the zooming magnification for setting the entire shelf 4 as the photographing range.

The camera 2 drives panning, tilting, and zooming according to the photographing conditions designated from the photographing control device 3. After setting the photographing direction, the zooming magnification, and the resolution according to the photographing conditions, as illustrated in FIG. 3, the camera 2 photographs a wide area image in the entire shelf 4 set as the photographing range. The camera 2 supplies the wire area image photographed under the designated photographing conditions to the photographing control device 3.

Figure 4:
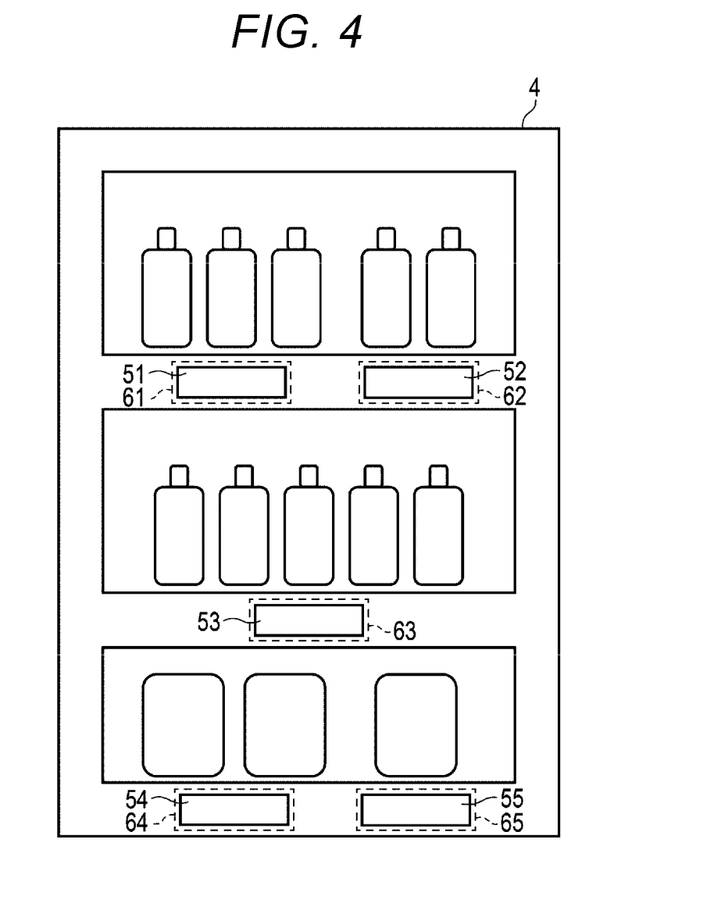
FIG. 4 is a diagram illustrating an example in which shelf tag regions are extracted in the wide area image acquired from the camera by the photographing control device.

Processing in which the photographing control device 3 detects regions of shelf tags present in the wide area image acquired from the camera 2 is explained.

FIG. 4 is a diagram illustrating an example in which the photographing control device 3 detects regions of shelf tags in the wide area image acquired from the camera 2.

If acquiring the wide area image photographed by the camera 2, the photographing control device 3 detects regions of shelf tags present in the acquired wide area image. If acquiring the wide area image illustrated in FIG. 4, the processor 31 of the photographing control device 3 extracts shelf tag regions (target object regions) 61 to 65 corresponding to the shelf tags 5 (51 to 55) from the wide area image.

The shelf tag regions 61 to 65 are regions including the shelf tags 51 to 55 present in the wide area image. The shelf tag regions 61 to 65 are regions of the shelf tags 51 to 55 segmented from the wide area image in the entire shelf 4 set as the photographing range. For example, the shelf tag region 61 is a rectangle surrounding the shelf tag 51. The shelf tag regions 61 to 65 may be designated in pixel units.

The processor 31 executes a region extraction program stored in the memory 32 to thereby extract shelf tag regions from the wide area image. The region extraction program extracts the shelf tag regions using a YOLO (You Only Look Once) network (deep learning), which is an object detection technique. The region extraction program may use an SSD (Single Shot MultiBox Detector), an FCIS (fully convolutional instance-aware semantic segmentation), or the like. The region extraction program may use AdaBoost in which a Haar-like characteristic used in face detection or the like is used. The region extraction program may be a program applied with a recognition engine in which a local feature value or the like such as SIFT (Scaled Invariance Feature Transform) is used. A method of the processor 31 extracting shelf tag regions (the region extraction program) is not limited to a method in which a specific algorithm is used.

The photographing control device 3 determining an order of photographing the shelf tag regions as narrow area images, detected from the wide area image is explained.

Figure 5:
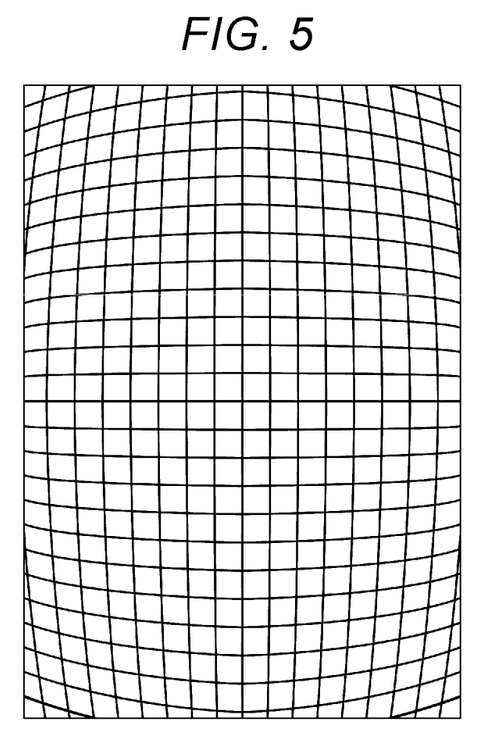
FIG. 5 is a diagram illustrating an example of distortion that occurs in a photographed image photographed by the camera controlled by the photographing control device.

If detecting shelf tag regions from the wide area image, the processor 31 of the photographing control device 3 specifies actual positions (accurate positions) of the detected shelf tag regions. Distortion corresponding to the specifications of the camera 2 occurs in a photographed image photographed by the camera 2. The influence of the distortion is large in the wide area image. Accordingly, the shelf tag regions detected from the wide area image are corrected based on distortion information decided as the specifications of the camera 2. The accurate (actual) positions of the shelf tag regions are specified by correcting the shelf tag regions based on the distortion information.

The distortion information is stored in the storage region 321 of the memory 32. The distortion information may be a table storing information indicating distortions at points of the wide area image. The distortion information may be a model formula for calculating distortions at the points of the wide area image. For example, the processor 31 of the photographing control device 3 corrects positions of the shelf tag regions 61 to 65 detected from the wide area image (for example, center coordinates of the shelf tag regions), based on the distortion information. Consequently, the processor 31 of the photographing control device 3 can specify the actual positions of the shelf tag regions 61 to 65 detected from the wide area image.

After specifying the actual positions of the shelf tag regions detected from the wide area image, the processor 31 of the photographing control device 3 determines photographing order for photographing the shelf tag regions respectively as narrow area images. For example, the processor 31 of the photographing control device 3 determines the photographing order to minimize a time required until narrow area images of all the shelf tag regions 61 to 65 are photographed in order. The processor 31 may determine the photographing order to minimize an operation time (a time required for operations such as panning, tilting, and zooming) of the camera 2 for photographing the narrow area images of the shelf tag regions 61 to 65. Further, the processor 31 may determine the photographing order to minimize driving of the camera 2 involved in panning, tilting, zooming, and the like corresponding to photographing conditions of the shelf tag regions 61 to 65.

Figure 6:
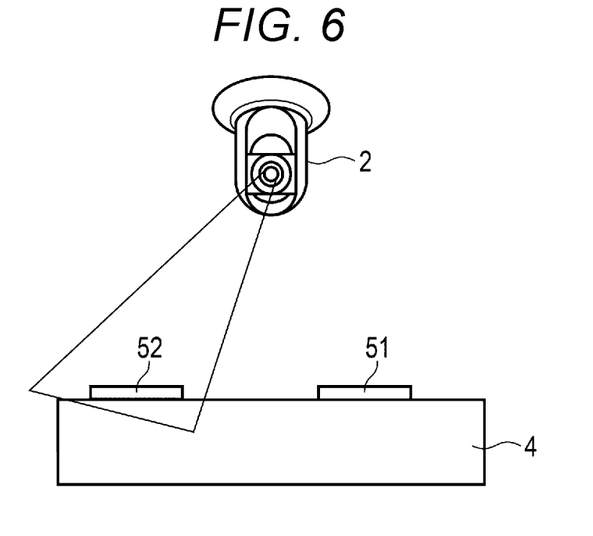
FIG. 6 is a diagram schematically illustrating a state in which the camera photographs a narrow area image based on photographing conditions designated by the photographing control device.

Processing in which the photographing control device 3 causes the camera 2 to photograph narrow area images is explained.

After determining the photographing order of the shelf tag regions, the processor 31 of the photographing control device 3 causes the camera 2 to photograph, as narrow area images, the shelf tag regions selected according to the photographing order.

FIG. 6 is a diagram schematically illustrating a state in which the camera 2 photographs the shelf tag region 62 including the shelf tag 52 as a narrow area image. In FIG. 6, as in FIG. 3, as an example, a state in which the camera 2 set in front of the shelf 4 photographs the shelf tag region 62 including the shelf tag 52 as a narrow area image is viewed from above.

If photographing the shelf tag region 62 including the shelf tag 52, as illustrated in FIG. 6, the processor 31 of the photographing control device 3 causes the camera 2 to photograph, at high resolution, a photographing range narrowed to the shelf tag region 62. The processor 31 determines a photographing direction (panning and tilting) and zooming magnification to set the shelf tag region 62 as a photographing region of a narrow area image. The photographing control device 3 designates, to the camera 2, photographing conditions including high resolution for a narrow area image in addition to the photographing direction and the zooming magnification for setting the shelf tag region 62 as the photographing range.

The camera 2 drives panning, tilting, and zooming according to the photographing conditions designated from the photographing control device 3. After setting the photographing direction, the zooming magnification, and the resolution according to the photographing conditions, as illustrated in FIG. 6, the camera 2 photographs a high-resolution image (a narrow area image) in a photographing range set in the shelf tag region selected according to the photographing order. The camera 2 supplies the narrow area image photographed under the designated photographing conditions to the photographing control device 3.

If acquiring the narrow area image photographed by the camera 2, the photographing control device 3 recognizes information displayed by a shelf tag included in the acquired narrow area image.

Figure 7:
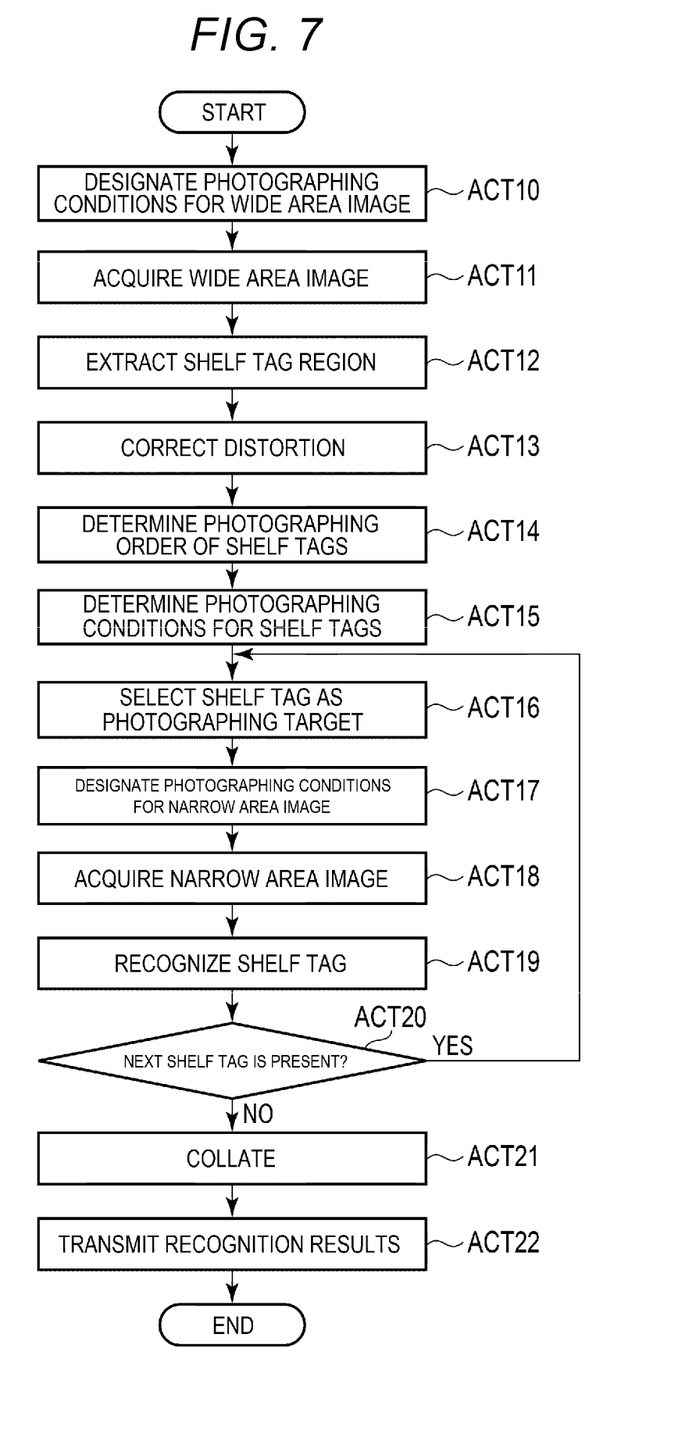
FIG. 7 is a flowchart for explaining an operation example of the photographing control device.

An operation example of the photographing control device 3 in the photographing system 1 according to at least one embodiment is explained.

FIG. 7 is a flowchart for explaining the operation example of the photographing control device 3 in the photographing system 1 according to at least one embodiment.

First, the processor 31 of the photographing control device 3 designates photographing conditions for causing the camera 2 to photograph a wide area image (ACT 10). It is assumed that the wide area image is photographed at predetermined low resolution (first resolution). The processor 31 sets a photographing range of the wide area image, which is detection regions of shelf tags. The photographing range of the wide area image only has to be a range photographable by the camera 2. The processor 31 sets the photographing range of the wide area image to cover the entire detection regions of the shelf tags, which are targets of detection.

For example, if all the shelf tags 5 disposed in the shelf 4 illustrated in FIG. 1 are set as detection targets, the processor 31 sets the entire shelf 4 as detection regions of the shelf tags 5 (51 to 55) (the photographing range of the wide area image). If the camera 2 is capable of photographing the entire detection regions of the shelf tags as the wide area image, the processor 31 sets the detection regions of the shelf tags (for example, the entire shelf) as the photographing range of the wide area image. If the entire detection regions of the shelf tags are larger than the range photographable by the camera 2, the processor 31 sets the photographing range to enable the camera 2 to separately photograph the entire detection regions of the shelf tags a plurality of times.

After determining the photographing range of the wide area image, the processor 31 designates, to the camera 2, photographing conditions for photographing the photographing range of the wide area image at predetermined low resolution. For example, the processor 31 determines a photographing direction, photographing magnification, resolution, and the like as the photographing conditions for photographing the photographing range of the wide area image. After determining the photographing conditions, the processor 31 instructs, to the camera 2, photographing of the wide area image under photographing conditions designated via the camera interface 34.

The camera 2 sets the photographing direction, the photographing magnification, the resolution, and the like designated as the photographing conditions from the photographing control device 3. After setting the photographing conditions, the camera 2 photographs an image (a wide area image) under the set photographing conditions. The camera 2 supplies the wide area image photographed under the designated photographing conditions to the photographing control device 3.

The processor 31 of the photographing control device 3 acquires, with the camera interface 34, the wide area image photographed by the camera 2 (ACT 11). If acquiring the wide area image from the camera 2, the processor 31 detects a shelf tag present in the acquired wide area image and extracts a shelf tag region including the detected shelf tag (ACT 12).

After extracting the shelf tag region from the wide area image, the processor 31 corrects the shelf tag region according to distortion that occurs in a photographed image of the camera 2 (ACT 13). The processor 31 corrects, based on the distortion information stored in the storage region 321, distortion of the shelf tag region extracted from the wide area image. The processor 31 corrects the distortion to thereby specify, for example, an actual position of the shelf tag region extracted from the wide area image.

After correcting the distortion based on the distortion information, the processor 31 determines photographing order for photographing the shelf tag regions respectively as narrow area images (ACT 14). The processor 31 determines the photographing order to enable the camera 2 to efficiently photograph all the shelf tag regions. For example, the processor 31 determines the photographing order to minimize a time for adjustment of the photographing direction of the camera 2.

A time required for the camera 2 to move the angle of view in the horizontal direction and a time required for the camera 2 to move the angle of view in the vertical direction are sometimes different. In such a case, the processor 31 may determine the photographing order to minimize a time for moving the photographing direction of the camera 2. Power consumption necessary for the camera 2 to move the angle of view in the horizontal direction and power consumption necessary for the camera 2 to move the angle of view in the vertical direction are sometimes different. In such a case, the processor 31 may determine the photographing order to minimize power consumption involved in the movement of the photographing direction of the camera 2.

The processor 31 determines photographing conditions for photographing the shelf tag regions as narrow area images (ACT 15). The processor 31 determines a photographing direction (a pan tilt coefficient), zooming magnification, resolution, and the like as photographing conditions for the shelf tag regions. For example, the processor 31 determines the photographing direction from the position of the camera 2 and the positions of the shelf tag regions. The processor 31 determines the zooming magnification from, for example, the distances from the camera 2 to the shelf tag regions. The processor 31 sets, from an image of a region including the shelf tag regions photographed by the camera 2, resolution (second resolution higher than the first resolution) for recognizing information displayed by the shelf tags.

Further, the processor 31 may determine information such as a focal length as the photographing conditions.

After determining the photographing conditions for the shelf tag regions, the processor 31 selects one shelf tag region as a photographing target of a narrow area image according to the photographing order (ACT 16). After selecting the shelf tag region as the photographing target, the processor 31 instructs, to the camera 2, via the camera interface 34, photographing conditions for photographing a narrow area image of the selected shelf tag region (ACT 17). The camera 2 sets a photographing direction, zooming magnification, and resolution according to the photographing conditions instructed from the photographing control device 3. If the setting of the photographing conditions is completed, the camera 2 photographs an image (a narrow area image). The camera 2 supplies the photographed narrow area image to the photographing control device 3.

The processor 31 of the photographing control device 3 acquires, via the camera interface 34, the narrow area image of the shelf tag region photographed by the camera 2 under the designated photographing conditions (ACT 18). If acquiring the photographed narrow area image of the selected shelf tag region, the processor 31 recognizes, from an image of the shelf tag region included in the acquired narrow area image, information displayed by the shelf tag (ACT 19).

The processor 31 performs character recognition or barcode recognition for an image of the shelf tag included in the narrow area image acquired from the camera 2 to thereby recognize the information displayed by the shelf tag. As a result, the processor 31 obtains a recognition result of the information displayed by the shelf tag in the shelf tag region selected according to the photographing order. The processor 31 retains, in the memory 32 or the storage device 33, the recognition result of the information displayed by the shelf tag.

If acquiring the recognition result of the information displayed by the shelf tag, the processor 31 determines if there is a shelf tag region that should be photographed as a narrow area image next (ACT 20). For example, the processor 31 determines, based on the photographing order determined in ACT 14, whether there is a shelf tag region that should be photographed next. If determining that there is a shelf tag region that should be photographed next (YES in ACT 20), the processor 31 returns to ACT 16, selects the shelf tag region that should be photographed next, and executes the processing explained above.

If determining that there is no shelf tag region that should be photographed next (NO in ACT 20), the processor 31 regards that recognition of information displayed by all shelf tags in a range photographed as the wide area image ends. However, if there is a region to be photographed as the wide area image next (a region where a shelf tag should be detected), the processor 31 returns to ACT 11 and repeatedly executes the processing explained above.

After the recognition of the information displayed by all the shelf tags ends, the processor 31 collates the recognition result of the shelf tag saved in the memory 32 or the storage device 33 and the information managed by the management server 7 (ACT 21). The management server 7 saves layout information indicating which shelf tags are disposed in which positions in the shelf. The processor 31 checks, based on the layout information acquired from the management server 7 and the recognition result of the shelf tag, whether shelf tags are present in predetermined positions of the shelf. The processor 31 transmits a processing result including recognition results of the shelf tags and a collation result to the management server 7 (ACT 22).

Every time the recognition result of the selected shelf tag is obtained, the processor 31 may output the recognition result of the shelf tag to the management server 7 via the communication interface 35. The processor 31 may transmit the collation result of the recognition results of the shelf tags and the layout information without transmitting a recognition result of an individual shelf tag. Further, the processor 31 may transmit information concerning a shelf tag determined as not coinciding with the layout information to the management server 7 without transmitting the recognition results of the shelf tags.

The photographing control device configured as explained above causes the camera to photograph, as a low-resolution wide area image, a region in a wide range including a shelf on which shelf tags, which are target objects of photographing, are disposed. The photographing control device extracts a region of an individual shelf tag (a shelf tag region) from the wide area image photographed by the camera. The photographing control device determines photographing order for photographing, at high resolution, the shelf tag region extracted from the wide area image. The photographing control device determines photographing conditions for photographing an individual shelf tag region as a high-resolution narrow area image. The photographing control device causes the camera to photograph, according to the photographing order, the individual shelf tag region under the photographing conditions for photographing the individual shelf tag region as a narrow area image. The photographing control device recognizes, based on an image of a shelf tag included in the narrow area image, information displayed by the shelf tag.

Consequently, the photographing control device can extract a shelf tag set as a recognition target in the low-resolution wide area image and determine photographing order and photographing conditions for efficiently photographing the shelf tag at high resolution. As a result, the photographing control device can easily extract a plurality of shelf tags set as recognition targets disposed in a wide range of a shelf or the like. The photographing control device can cause the camera to efficiently photograph, at high resolution, an extracted individual shelf tag while suppressing a useless motion and can efficiently recognize the shelf tags.

The several embodiments are explained above. However, these embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A photographing device comprising:
a communication interface communicably connected to a server and configured to receive management information from the server, the management information being associated with target objects;
a camera interface configured to:
supply a control signal to a camera, and
acquire a photographed image photographed by the camera; and
a processor configured to:
cause the camera to photograph a wide area image in a detection region of the target objects set as a photographing range,
detect the target objects present in the wide area image photographed by the camera,
determine a photographing order of the target objects detected from the wide area image,
cause the camera to photograph a narrow area image of one target object selected according to the photographing order,
determine a recognition result from the narrow area image,
compare the recognition result with the management information to determine a processing result, and
transmit, via the communication interface, the processing result to the server, wherein
the management information is layout information indicating predetermined positions of shelf tags on a shelf.

2. The device of claim 1, wherein the processor determines photographing conditions including a photographing direction and zooming magnification for photographing narrow area images of the shelf tags detected from the wide area image, and causes the camera to set photographing conditions for photographing the narrow area image of the shelf tag selected according to the photographing order.

3. The device of claim 1, further comprising a memory configured to store distortion information indicating distortion that occurs in an image photographed by the camera, wherein
the processor corrects, based on the distortion information stored by the memory, regions of the target objects detected from the wide area image.

4. The device of claim 1, wherein the processor extracts a shelf tag region comprising the target objects.

5. The device of claim 4, wherein, after extracting the shelf tag region from the wide area image, the processor corrects the shelf tag region according to distortion that occurs in the photographed image of the camera.

6. The device of claim 5, wherein the processor specifies an actual position of the shelf tag region extracted from the wide area image to correct the distortion.

7. The device of claim 1, wherein the target objects are the shelf tags disposed in the shelf.

8. A photographing method comprising:
receiving, from a server, management information associated with target objects;
causing a camera to photograph a wide area image in a detection region of the target objects set as a photographing range;
detecting the target objects present in the wide area image photographed by the camera;
determining a photographing order of the target objects detected from the wide area image;
causing the camera to photograph a narrow area image of one target object selected according to the photographing order;
determining a recognition result from the narrow area image;
comparing the recognition result with the management information associated with the target objects and managed by a server to determine a processing result; and
transmitting the processing result to the server, wherein
the management information is layout information indicating predetermined positions of shelf tags on a shelf.

9. The method of claim 8, further comprising determining photographing conditions including a photographing direction and zooming magnification for photographing narrow area images of the shelf tags detected from the wide area image, and causing the camera to set photographing conditions for photographing the narrow area image of the shelf tag selected according to the photographing order.

10. The method of claim 8, further comprising storing distortion information indicating distortion that occurs in an image photographed by the camera, and
correcting, based on the distortion information stored by the memory, regions of the target objects detected from the wide area image.

11. The method of claim 8, further comprising extracting a shelf tag region comprising the target objects.

12. The method of claim 11, further comprising, after extracting the shelf tag region from the wide area image, correcting the shelf tag region according to distortion that occurs in the photographed image of the camera.

13. The method of claim 12, further comprising specifying an actual position of the shelf tag region extracted from the wide area image to correct the distortion.

14. The method of claim 8, wherein the target objects are the shelf tags disposed in the shelf.

15. The device of claim 1, wherein the processor determines the recognition result by performing at least one of character recognition of the shelf tag or barcode recognition of the shelf tag.

* * * * *